United States Patent [19]
Castellano

[11] Patent Number: 5,555,524
[45] Date of Patent: Sep. 10, 1996

[54] SEMI-SYNCHRONOUS DUAL PORT FIFO

[75] Inventor: Andrew J. Castellano, Laguna Beach, Calif.

[73] Assignee: Standard Microsystems Corporation, Hauppauge, N.Y.

[21] Appl. No.: 388,234

[22] Filed: Feb. 13, 1995

[51] Int. Cl.⁶ ........................................ G11C 7/00
[52] U.S. Cl. .................... 365/221; 365/233; 365/236
[58] Field of Search ................................ 365/219, 221, 365/189.07, 236, 233, 230.05, 189.04; 377/34, 39

[56] References Cited

U.S. PATENT DOCUMENTS 5,084,841  1/1992  Williams et al. ............... 365/189.07
5,365,485  11/1994  Ward et al. ....................... 365/221
5,426,756  6/1995  Shyi et al. .................. 365/189.07 X

*Primary Examiner*—Joseph A. Popek
*Attorney, Agent, or Firm*—Meltzer, Lippe, Goldstein et al.

[57] ABSTRACT

An FIFO is provided which has two synchronous ports that may operate asynchronously to one another. The FIFO design is unaffected by gate delays, and is therefore especially useful in an integrated circuit where gate delays may not be easily controlled (such as a standard cell or gate array design.) In the FIFO, a write counter controlled by a write clock outputs a write address and a read counter controlled by a read clock with a different frequency outputs a read address. Synchronization circuits are provided to synchronize the read address to the write clock and the write address to the read clock. The synchronized read and write addresses are used to generate full and empty indicators for the FIFO and an occupancy level for the FIFO.

8 Claims, 3 Drawing Sheets

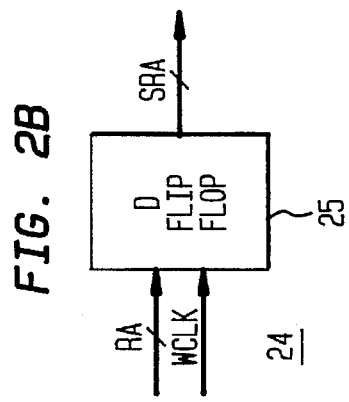
FIG. 3
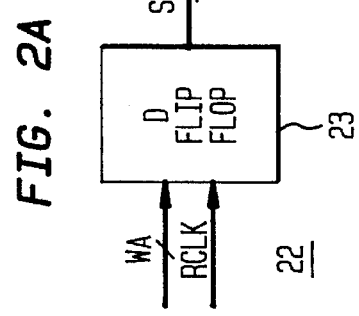
FIG. 4
FIG. 2A
FIG. 2B

SEMI-SYNCHRONOUS DUAL PORT FIFO

FIELD OF THE INVENTION

The present invention relates to a FIFO (First-In-First-Out) memory. More specifically the present invention relates to a dual port FIFO in which the ports may operate at different frequencies. The present invention also relates to a FIFO for use in an asynchronous circuit in which there are unpredictable gate delays. The present invention provides a FIFO which is unaffected by gate delays.

BACKGROUND OF THE INVENTION

FIFO memories have numerous applications in electronic circuits and systems. In many cases, a FIFO memory serves as a buffer between two portions of an electronic circuit or system which operate asynchronously to one another. In this case, data words are simultaneously written into the FIFO at one rate and read out of the FIFO at a different rate.

It is important to be able to determine the current occupancy level of the FIFO. One prior art technique for doing this is to use an up-down counter. The counter counts up when a word is written into the FIFO, counts down when a word is read from the FIFO, and remains unchanged when a read and write occur simultaneously. In this case, the current count is the current occupancy level. However, to implement this technique read and write events must be synchronized to the same clock. When the read and write clock are asynchronous, yet have similar frequencies (e.g., less 2:1 ratio), this technique is no longer useful.

Another way to determine the occupancy level of the FIFO is to subtract the read address (i.e., the read pointer) from the write address (i.e., the write pointer). However, in order for the subtraction to have meaning, the read and write addresses are generally required to be stable values and to be synchronized to the same clock. These criteria (stability and synchronization to the same clock) are not always easy to achieve.

Another problem affecting FIFO performance is that in an asynchronous circuit, unpredictable gate delays may affect circuit functionality. In many cases, delay matching may be used to control when particular signals occur. However, in the case of an integrated circuit generated using automatic place and route tools (e.g. standard cell designs or gate arrays), it is not feasible to use delay matching to control when signals occur. Thus, the reliability of a FIFO incorporated in an asynchronous integrated circuit formed from standard cells may be impacted by unpredictable gate delays.

Accordingly, it is an object of the present invention to provide a FIFO which overcomes the prior art problems discussed above.

Specifically, it is an object of the invention to provide a FIFO in which the read clock and write clock are asynchronous to one another and in which the FIFO level is obtained by subtracting read and write addresses which are synchronized to the same clock.

It is also an object of the invention to provide a FIFO which is unaffected by unpredictable gate delays.

SUMMARY OF THE INVENTION

A FIFO in accordance with the present invention comprises a dual port RAM (Random Access Memory). A write counter increments to generate a write address every time a word is to be written into the RAM. A read counter increments to generate a read address every time a word is read from the RAM.

The read counter is incremented in accordance with a read clock which has a first frequency (e.g., 25 Mhz) and a read enable signal synchronous to that clock. The write counter is incremented in accordance with a write clock which has a second frequency (e.g., 33 Mhz) and a write enable signal synchronous to that clock. The counters are implemented as Gray code counters because in such counters only one bit position changes in each cycle so as to provide increased stability. (In the case of a sequential counter, multiple bit positions change in each cycle.)

It is important to know the level of the FIFO (the number of valid words in the RAM) and to provide an indication when the FIFO is full and when the FIFO is empty. To determine the FIFO level, the read address value is subtracted from the write address value. To perform the subtraction, stable address values are required which are synchronized to the same clock.

Accordingly, the FIFO includes a first synchronization circuit for synchronizing the write address to the read clock. The output is referred to herein as a synchronized write address. A second synchronization circuit synchronizes the read address to the write clock. The output is referred to herein as a synchronized read address. The synchronized address may be delayed up to one clock period, but will always be accurate. If a sequential address were to be sampled by an asynchronous clock, the output could be invalid.

To obtain the FIFO level, Gray code-to-sequential converters convert the synchronized read address and the write address (or read address and the synchronized write address) to sequential form. A subtractor then outputs the level. The accuracy of the FIFO level depends on which address is synchronized. When the synchronized read address is subtracted from the write address, the FIFO level is stable on the write clock, and the FIFO level is guaranteed to be less than or equal to the output of the subtractor. This output can be used to prevent FIFO overruns from occurring. When the read address is subtracted from the synchronized write address, the FIFO level is stable on the read clock, and the FIFO level is guaranteed to be greater than or equal to the output of the subtractor. This output can be used to prevent FIFO underruns from occurring.

An empty indicator circuit outputs an empty indicator when the read address equals the synchronized write address and the last operation was a read.

A full indicator circuit outputs a full indicator when the write address equals the synchronized read address and the last operation was a write.

The FIFO of the present invention is especially useful in integrated circuits designed using standard cells because the inventive FIFO is unaffected by gate delays.

BRIEF DESCRIPTION OF THE DRAWINGS

FIG. 2A and FIG. 2B illustrate synchronizing circuits for use in the FIFO of FIG. 1.

FIG. 3 schematically illustrates a circuit for indicating when the FIFO of FIG. 1 is empty.

FIG. 4 schematically illustrates a circuit for indicating when the FIFO of FIG. 1 is full.

DETAILED DESCRIPTION OF THE INVENTION

Figure 1:
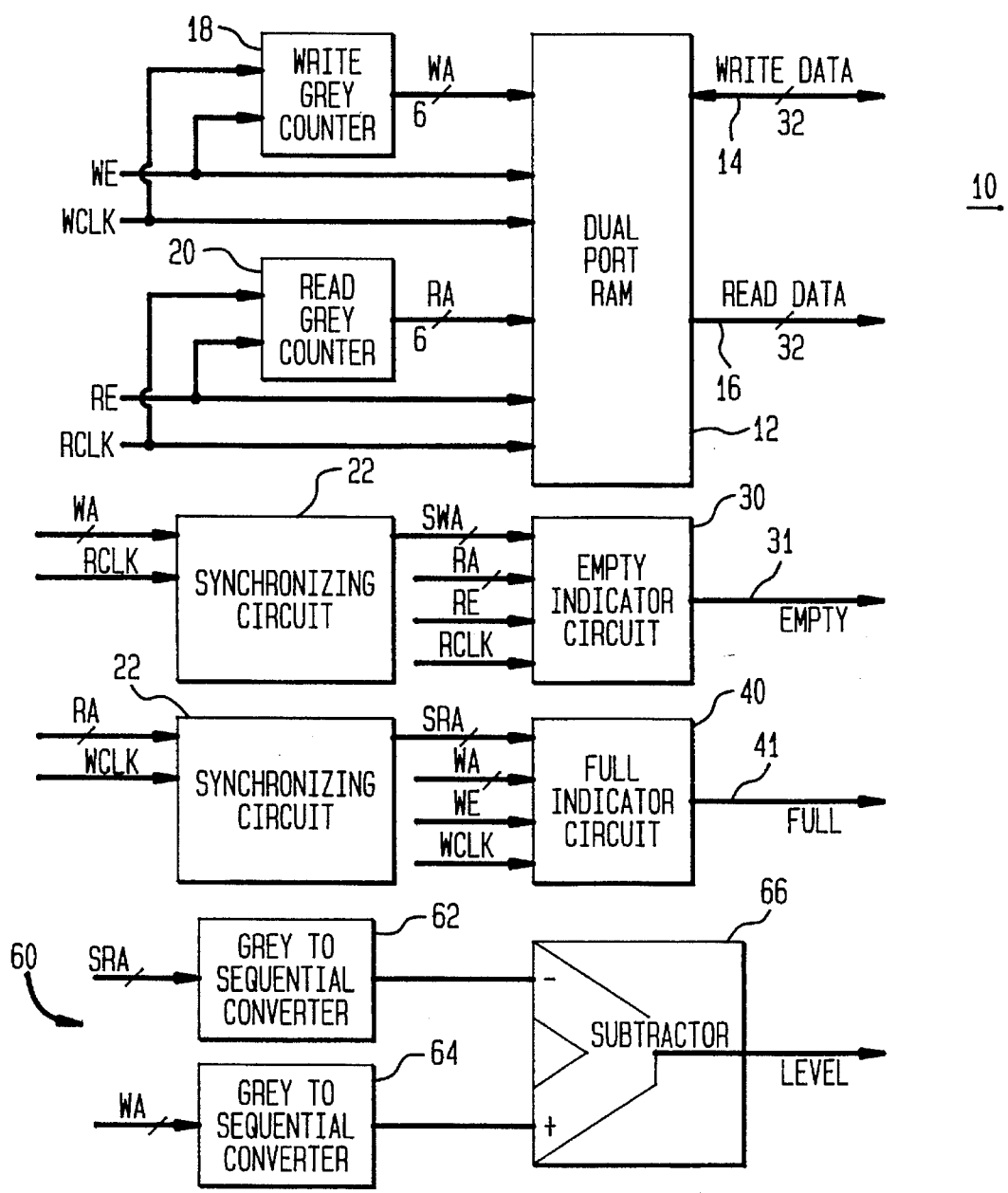
FIG. 1 schematically illustrates a FIFO in accordance with an illustrative embodiment of the present invention.

A FIFO 10 in accordance with an illustrative embodiment of the invention is shown in FIG. 1. The FIFO 10 comprises a dual port RAM 12. Data words, which for example are thirty-two bits wide, are written into the RAM 12 via the port 14. Data words are read from the RAM 12 via the port 16.

Data words are written into the RAM 12 at locations indicated by a write address (WA). Illustratively, the write address is six bits wide. The writing of words into the dual port RAM 12 takes place when a write enable signal (WE) is true and under the control of a write clock (WCLK). The write address is generated by a write counter 18. The write counter 18 is incremented when WE is true and under the control of WCLK to generate successive write addresses.

Data words are read from the RAM 12 at locations indicated by a read address (RA). Illustratively, the read address is six bits wide. The reading of words from the dual port RAM 12 takes place when a read enable signal (RE) is true and under control of a read clock (RCLK). The read address is generated by a read counter 20. The read counter is incremented when RE is true and under the control of RCLK to generate successive read addresses.

In general, the FIFO 10 is used to bridge between two clock domains that are asynchronous to one another. Typically, the read clock and write clock have different frequencies. For example, WCLK=33 Mhz and RCLK=25 Mhz.

The FIFO 10 includes a circuit 60 for obtaining the FIFO occupancy level, a circuit 30 for obtaining a full indicator, and a circuit 40 for obtaining an empty indicator. These circuits make use of a read address which is synchronized to the write clock and a write address which is synchronized to the read clock.

If the counters 18 and 20 were to be implemented as conventional sequential counters, multiple address bit positions could change with each successive increment. When such a counter is sampled with an asynchronous clock (that is, read counter sampled with write clock or write counter sampled with read clock), bogus values can be obtained.

Accordingly, in a preferred embodiment of the invention, the write counter 18 and the read counter 20 are implemented as Gray code counters. In a Gray code counter, no more than one address bit position changes for each increment. Table 1 below compares the Gray code and sequential representations of the numbers zero through seven.

Although there are numerous ways to the Gray code, the sequence shown below will produce the simplest Gray-code to sequential conversion table.

TABLE 1

| Decimal | Gray | Sequential |
|---------|------|------------|
| 0 | 000 | 000 |
| 1 | 001 | 001 |
| 2 | 011 | 010 |
| 3 | 010 | 011 |
| 4 | 110 | 100 |
| 5 | 111 | 101 |
| 6 | 101 | 110 |
| 7 | 100 | 111 |

Note that in the Gray code representation no more than one bit position changes for each increment. In the case of the sequential binary count, several bit positions can change for particular increments; e.g., two bit positions change when the count changes from one to two and three bit positions change when the count changes from three to four.

The FIFO 10 of FIG. 1, includes a first synchronizing circuit 22 for synchronizing the write address (WA) to the read clock (RCLK). The output is a write address signal synchronized to the read clock, which signal is denoted by SWA. A second synchronizing circuit 24 synchronizes the read address (RA) to the write clock (WCLK). The output is a read address signal synchronized to the write clock, which signal is designated SRA.

FIG. 2A shows the synchronizing circuit 22 in greater detail. The synchronizing circuit 22 is implemented as a D-flip-flop 23. The signal WA is clocked through the flip-flop 23 synchronously with RCLK to produce the output SWA. As shown in FIG. 2B, the synchronizing circuit 24 is also implemented as a D-flip-flop 25. The signal RA is clocked through the flip-flip 25 synchronously with WCLK to produce the output SRA.

Returning to FIG. 1, the FIFO 10 includes an empty indicator circuit 30 for producing an indication when the RAM 12 is empty to avoid underflow. The inputs to the circuit 30 are SWA, RA, RE and RCLK and the output is an empty flag on line 31. The empty indicator circuit 30 outputs an empty flag when RA=SWA and either the read enable was true on the previous read clock or the empty indicator output was true on the previous read clock. A full indicator circuit 40 produces an indication when the RAM is full to avoid overflow. The inputs to the circuit 40 are SRA, WA, WE and WCLK and the output is a full flag on line 41. The full indicator circuit 40 outputs a full flag when WA=SRA and either the write enable was true on the previous write clock or the full indicator output was true on the previous write clock.

The empty indicator circuit 30 is shown in greater detail in FIG. 3. The circuit 30 includes a comparator 32 whose output is true when RA=SWA. The signal LRE is obtained by delaying RE by one cycle of the read clock RCLK using the D-flip-flop 35. When LRE is true it means a read occurred during the last cycle of the read clock. The circuit 30 also includes the OR-gate 36 and the D-flip-flop 38. The inputs of the OR gate 36 are the output of the flip-flop 35 and the output of the flip-flop 38. The output of the OR-gate 36 is ANDed with the output of the comparator 32 using the AND-gate 34. The output of the AND-gate 34 is clocked through the flip-flop 38 synchronously with RCLK and returned to one input of the OR-gate 36. The empty flag appears on line 31 as the output of the AND-gate 34. The condition RA=SWA may alternately be determined by testing the output of the FIFO level indication circuit 60 (as described below) to be equal to zero.

The full indicator circuit 40 is shown in greater detail in FIG. 4. The circuit 40 includes a comparator 42 whose output is true when WA=SRA. The signal LWE is obtained by delaying WE by one cycle of the write clock WLCK using the D-flip-flop 45. When LWE is true it means a write occurred during the last cycle of the write clock. The circuit 40 also includes the OR-gate 46 and the D-flip-flop 48. The inputs of the OR-gate 46 are the output of flip-flop 45 and the output of the flip-flop 48. The output of the OR-gate 46 is ANDed with the output of the comparator 42 using the AND gate 44. The output of the AND gate 44 is clocked through the flip-flop 48 synchronously with WCLK and returned to one input of the OR-gate 46. The empty flag appears on line 41 as the output of the AND-gate 44.

The condition SRA=WA may alternatively be determined by testing the output of the FIFO level indication circuit 60 (as described below) to be equal to zero.

The FIFO 10 of FIG. 1 also includes a circuit 60 for determining the current occupancy level of the FIFO. This level may be determined by |WA−SRA| or |SWA−RA|. Both of these formulas require the subtraction of quantities synchronized to the same clock. The circuit 60 of FIG. 1 determines |SRA−WA|. The circuit 60 comprises a first Gray code-to-sequential converter 62 for converting SRA to sequential form. A second Gray code-to-sequential converter 64 converts WA to sequential form. A subtractor 66 which operates on numbers in sequential form then subtracts SRA from WA to obtain the level. A similar circuit comprising two Gray code-to-sequential converters and a subtractor is utilized if the level is determined according to |SWA−RA|.

Figure 5:
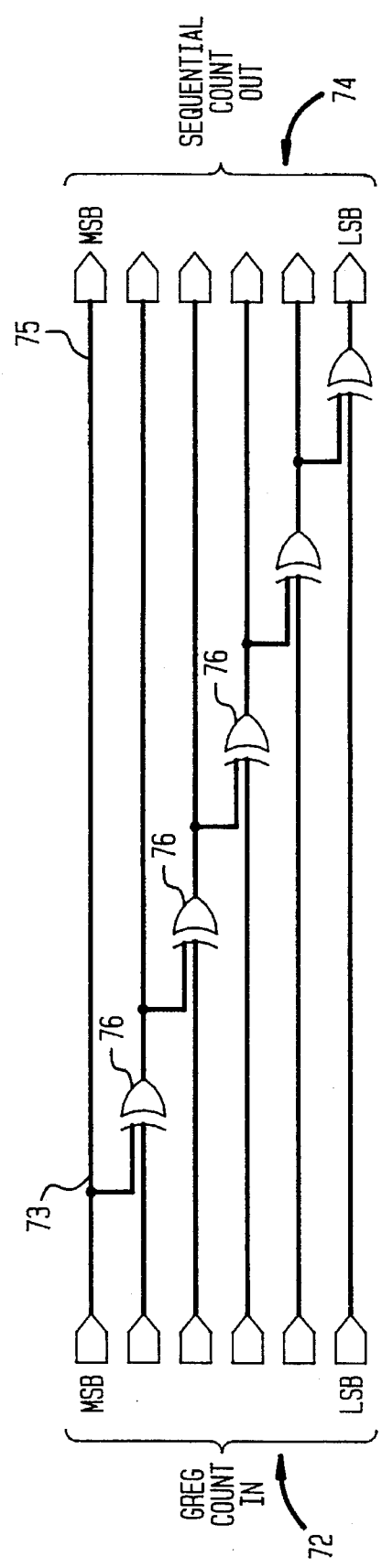
FIG. 5 schematically illustrates a Gray code count to sequential count converter for use in the FIFO of FIG. 1.

A Gray code-to-sequential converter 62 or 64 is shown in FIG. 5. The converter 62 or 64 has an input 72 for receiving an address (e.g., WA or SRA) in Gray code format. Illustratively, in the FIFO 10 of FIG. 1, the addresses are six bits wide so that the input 72 includes an input line 73 for each of the six bits. The converter 62 or 64 also has an output 74 for outputting an address signal in sequential format. The output 74 includes six individual output lines 75. The Gray code-to-sequential conversion is accomplished using the exclusive OR (XOR) gates 76.

In short, a unique FIFO which is unaffected by gate delays and which is suitable for use in an asynchronous circuit has been disclosed. Finally, the above described embodiments of the invention are intended to be illustrative only. Numerous alternative embodiments may be devised by those skilled in the art without departing from the spirit and scope of the following claims.

I claim:

1. A FIFO comprising, a memory, a write counter for generating a write address for writing a word into said memory in response to a write clock having a first frequency and a write enable signal, a read counter for generating a read address for reading a word from said memory in response to a read clock having a second frequency and a read enable signal, a first synchronizing circuit for synchronizing the write address to the read clock so as to output a synchronized write address, a second synchronizing circuit for synchronizing the read address to the write clock so as to output a synchronized read address, a level indicator circuit for outputting a signal indicative of the number of words currently stored in the memory, an empty indicator circuit responsive to the first synchronizing circuit for outputting an indicator when the memory is empty, and a full indicator circuit responsive to the second synchronizing circuit for outputting an indicator when the memory is full.

2. The FIFO of claim 1 wherein said write counter and said read counter change in only a single bit position in each successive count.

3. The FIFO of claim 1 wherein said write counter is a first Gray code counter and said read counter is a second Gray code counter.

4. A FIFO comprising, a memory, a write counter for generating a write address for writing a word into said memory in response to a write clock having a first frequency and a write enable signal, a read counter for generating a read address for reading a word from said memory in response to a read clock having a second frequency and a read enable signal, a first synchronizing circuit for synchronizing the write address to the read clock so as to output a synchronized write address, a second synchronizing circuit for synchronizing the read address to the write clock so as to output a synchronized read address, a level indicator circuit for outputting a signal indicative of the number of words currently stored in the memory, an empty indicator circuit responsive to the first synchronizing circuit for outputting an indicator when the memory is empty, and a full indicator circuit responsive to the second synchronizing circuit for outputting an indicator when the memory is full, wherein said write counter is a first Gray code counter and said read counter is a second Gray code counter, wherein said level indicator circuit comprises a first Gray code-to-sequential converter for converting the synchronized read address to sequential form, a second Gray code-to-sequential converter for converting the write address to sequential form, and a subtractor for obtaining the difference of the outputs of the first and second converters.

5. A FIFO comprising, a memory, a write counter for generating a write address for writing a word into said memory in response to a write clock having a first frequency and a write enable signal, a read counter for generating a read address for reading a word from said memory in response to a read clock having a second frequency and a read enable signal, a first synchronizing circuit for synchronizing the write address to the read clock so as to output a synchronized write address, a second synchronizing circuit for synchronizing the read address to the write clock so as to output a synchronized read address, a level indicator circuit for outputting a signal indicative of the number of words currently stored in the memory, an empty indicator circuit responsive to the first synchronizing circuit for outputting an indicator when the memory is empty, and a full indicator circuit responsive to the second synchronizing circuit for outputting an indicator when the memory is full, wherein said write counter is a first Gray code counter and said read counter is a second Gray code counter, wherein said level indicator circuit comprises a first Gray code-to-sequential converter for converting the synchronized write address to sequential form, a second Gray code-to-sequential converter for converting the read address to sequential form, and a subtractor for obtaining the difference of the outputs of the first and second converters.

6. The FIFO of claim 1 wherein said empty indicator circuit outputs an empty indicator when said read address equals the synchronized write address and either the read enable signal was true on the previous read clock or the empty indicator output was true on the previous read clock.

7. The FIFO of claim 1 wherein said full indicator outputs a full indicator when said write address equals the synchronized read address and either the write enable signal was true on the previous write clock or the full indicator output was true on the previous write clock.

8. A FIFO comprising, a memory, a write counter for generating a write address in said memory under the control of a write clock, a read counter for generating a read address in said memory under control of a read clock having a different frequency from the write clock, synchronizing circuitry which synchronizes the write address to the read clock and the read address to the write clock, and circuitry which is responsive to the synchronization circuitry and which generates an occupancy level for the memory, a fullness indicator for the memory, and an empty indicator for the memory.

* * * * *